Oct. 25, 1955

R. U. GUTHRIE 2,721,496

APPARATUS FOR MAKING COMPOSITE FIGURE
COLOR SEPARATION NEGATIVES

Filed Oct. 3, 1952

INVENTOR.
ROBERT U. GUTHRIE
BY
Oldham & Oldham
ATTORNEYS

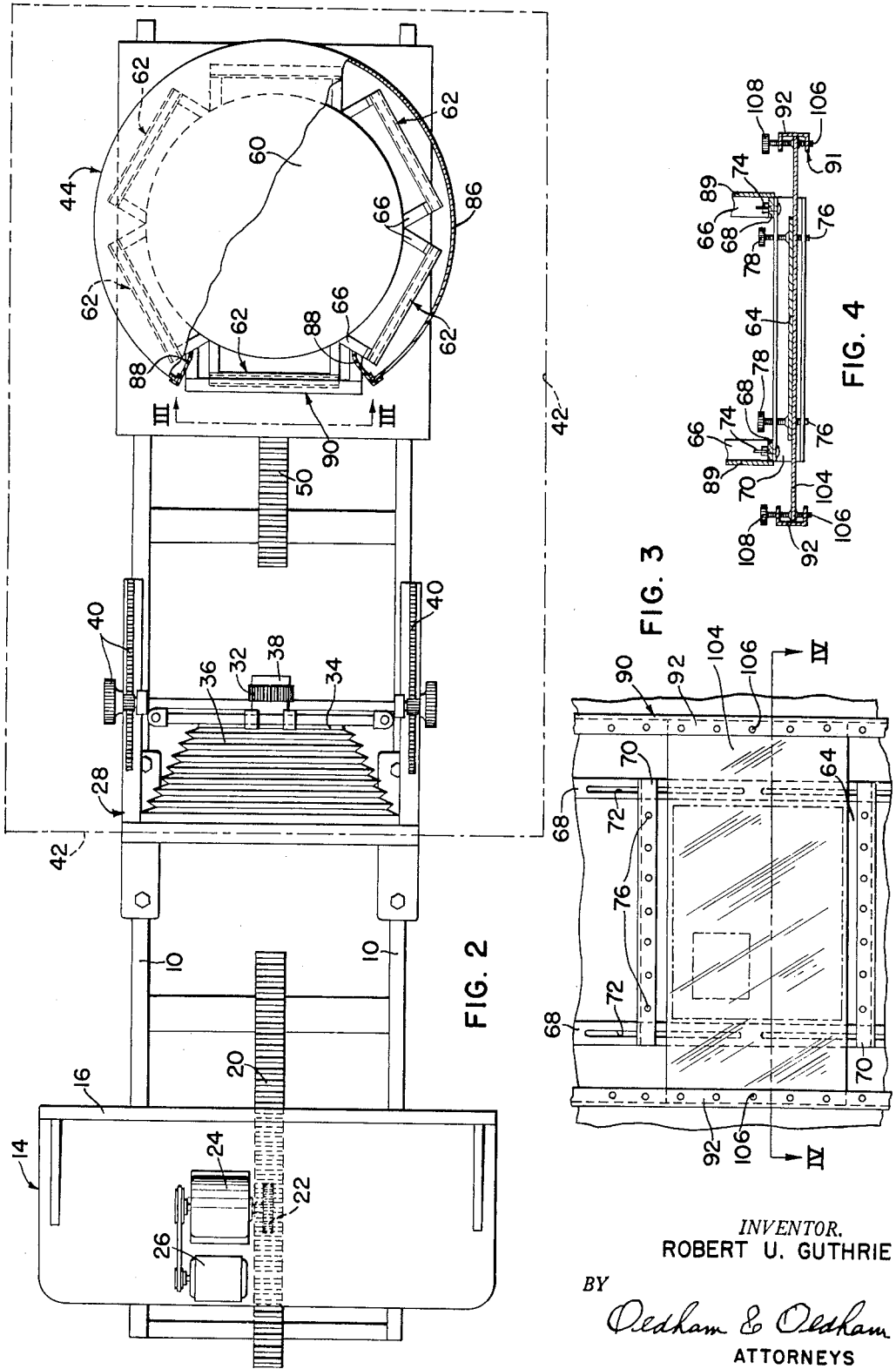

Oct. 25, 1955        R. U. GUTHRIE        2,721,496
APPARATUS FOR MAKING COMPOSITE FIGURE
COLOR SEPARATION NEGATIVES

Filed Oct. 3, 1952                                 3 Sheets-Sheet 3

*INVENTOR.*
ROBERT U. GUTHRIE
BY
*Oldham & Oldham*
ATTORNEYS

United States Patent Office 2,721,496
Patented Oct. 25, 1955

2,721,496

APPARATUS FOR MAKING COMPOSITE FIGURE COLOR SEPARATION NEGATIVES

Robert U. Guthrie, Akron, Ohio

Application October 3, 1952, Serial No. 312,902

5 Claims. (Cl. 88—24)

The invention relates to apparatus for making color separation negatives to be used in the manufacture of color separation photolithograph printing plates, and, more particularly, is concerned with apparatus for making negatives bearing a composite of figures, portions, or displays.

In the present state of the art, and prior to my invention, the production of composite figure color separation negatives has been an elaborate time-consuming process involving multiple pieces of equipment and very skilled operators, and requiring a considerable period of time. But even with all of the variables being handled with extreme care poorly registering printing plates are periodically produced which are unsatisfactory for high grade commercial work.

It is the general object of my invention to avoid and overcome the foregoing and other difficulties of prior art practices by the provision of improved, simplified, and less skill-requiring apparatus for relatively rapidly producing composite figure color separation negatives possessing extremely accurate registration characteristics.

Another object of my invention is the provision of apparatus for quickly and inexpensively producing composite figure color separation negatives, the apparatus being capable of being handled by an ordinary skilled workman as distinct from an expert.

Another object of my invention is to provide an improved apparatus for simplifying and speeding up the production of composite figure color separation negatives.

The foregoing objects of my invention, and other objects which will become apparent as the description proceeds, are achieved by the provision of a method which includes the steps of mounting one figure, of a plurality of figures, focusing the figure to the desired scale and orientation of the composite figure negatives, exposing only the portion of a first color separation negative to receive and photograph the focused figure, repeating the exposure with appropriate filter separation on each of the other color separation negatives, mounting a second figure, focusing the second figure to the desired scale and orientation of the composite figure negatives, exposing only a second portion of the first color separation negative, the second portion to receive and photograph the focused second figure, repeating the exposure with appropriate filter separation on each of the other color separation negatives, and mounting any additional figures and repeating the steps set forth to provide a complete set of color separation negatives bearing any desired composite of figures, each figure being to desired scale and orientation.

In the apparatus of my invention I include the combination of a darkroom, a lens extending through one wall of the room in adjustable but light-tight relation therewith, means for associating different filters with the lens, a copy carrier positioned outside the darkroom in alignment with the lens, means for adjusting the position of the copy carrier, a turret in the darkroom and rotatable about an axis, means for adjusting the turret in relation to the lens, a plurality of negative carriers on the turret, means for locking the turret in any one of a plurality of indexed positions to position any negative carrier in alignment with the lens, and a masking mechanism movable to masking relation with any negative carrier when it is in alignment with the lens, and movable away from masking relation when the turret is indexed to bring another carrier into alignment with the lens.

For a better understanding of my invention reference should be had to the accompanying drawings wherein:

Fig. 2 is a plan view of the apparatus illustrated in Fig. 1, certain parts of the turret being broken away to better illustrate the construction thereof;

Fig. 3 is an enlarged fragmentary elevational view, taken substantially on line III—III of Fig. 2, and illustrating details of the negative carrier and masking mechanism;

Fig. 4 is a horizontal cross sectional view taken on line IV—IV of Fig. 3, but somewhat enlarged to better illustrate further details of construction of the negative carrier and masking mechanism;

Figure 9:
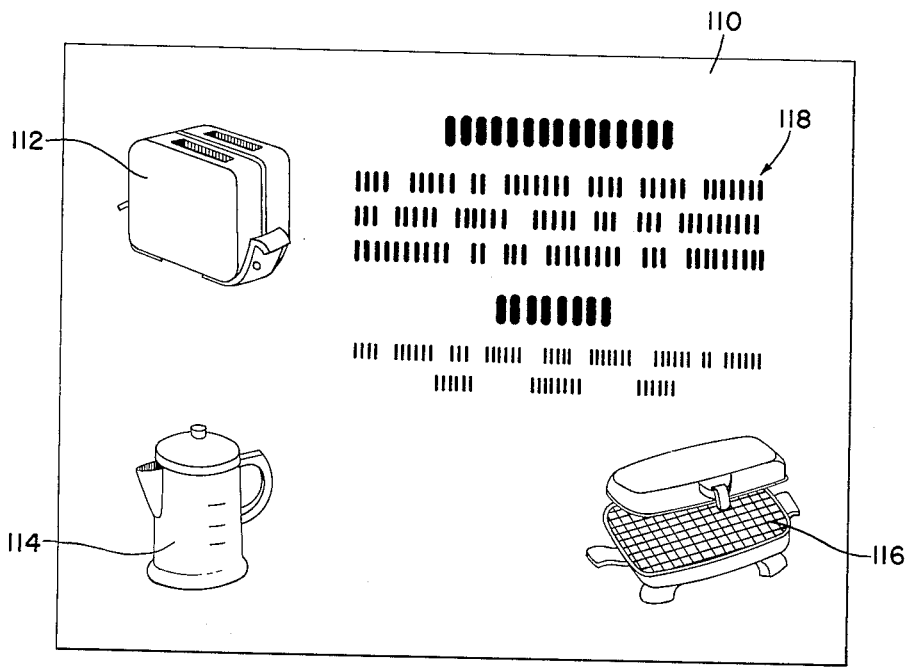

Figs. 5 to 8 are diagrammatic elevational views of different masks employed in my apparatus and method in the production of a typical set of composite figure color separation negatives; and Fig. 9 is a diagrammatic illustration of the printed reproduction of the composite figure produced from the printing plates made by the color separation negatives in the typical example described and illustrated.

Having more particular reference to the drawings, the apparatus of the invention may conveniently include a pair of rails 10 which are often resiliently carried by springs or rubber mounts 12 to shield or protect the apparatus from vibration, if this be desired. At one end of the rails 10 is mounted a copy board or copy carrier, indicated as a whole by the numeral 14, including a vertically positioned easel 16 on which any desired pieces of copy can be positioned. The copy carrier 14 is provided with flange wheels 18 riding upon the rails 10, and any suitable means are provided for moving the copy carrier back or forth on the rails and to a desired position thereon. These means have been illustrated in the form of the invention shown as including a rack 20 carried between the rails, a pinion 22 engageable with the rack and driven through a reduction gear box 24 by an electric motor 26.

Also mounted on the rails 10 is a lens support, indicated as a whole by the numeral 28, and including an upright 30, a lens 32 mounted on a lens board 34 connected to a bellows 36 which extends to and surrounds an aperture in the upright 30. A holder 38 for removably receiving a plurality of color separation filters is associated with the lens 32, and conventional supporting and adjusting mechanism 40 is associated with the lens board 34 to allow for vertical, lateral, and, if desired, in and out adjustment.

Figure 1:
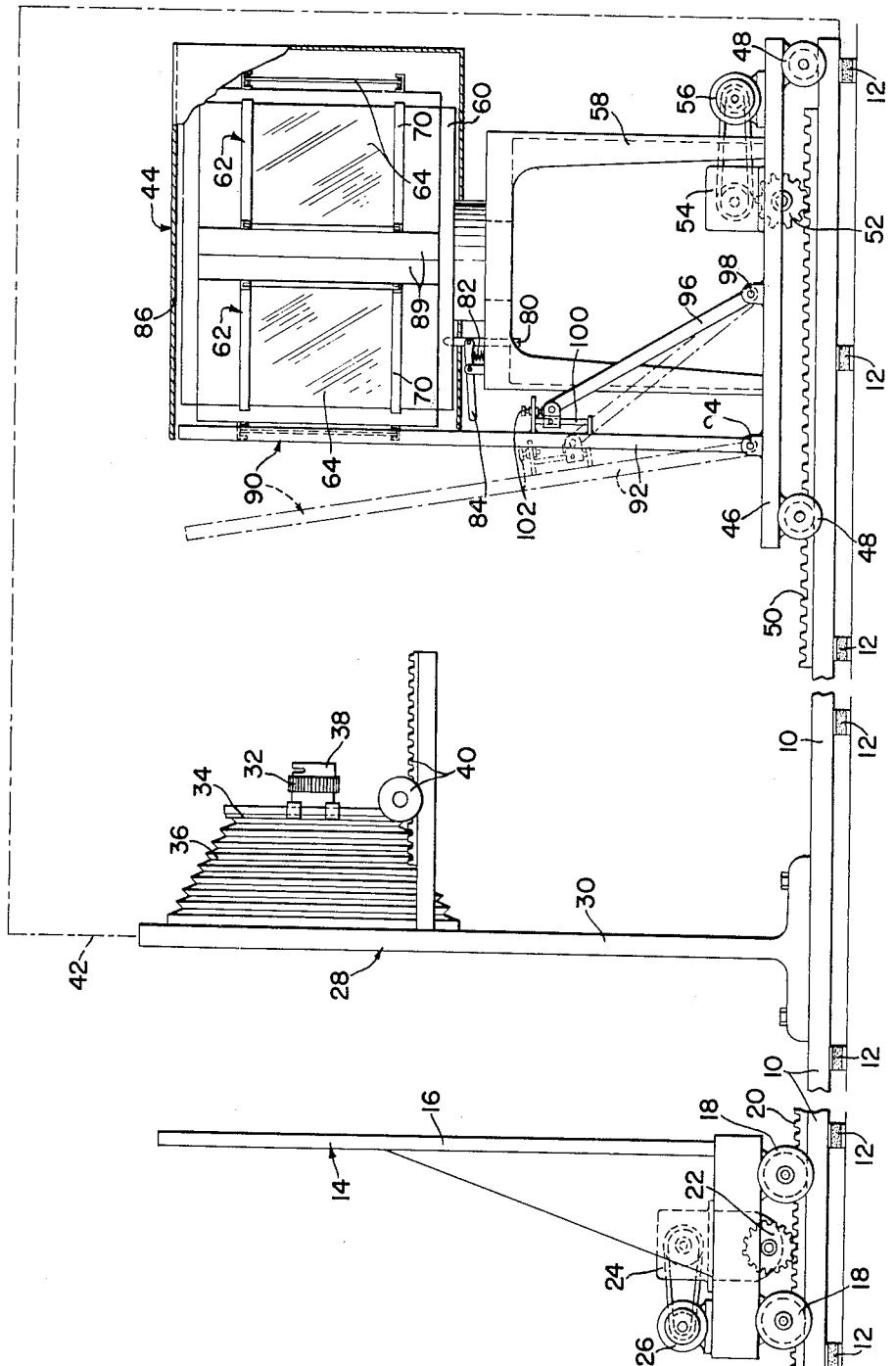
Fig. 1 is a side elevation, partially broken away, and illustrating one apparatus embodiment of my invention.

As illustrated in Figs. 1 and 2, the apparatus of my invention is adapted to be associated with an enclosure, indicated by the chain dotted line 42, which provides, in effect, a darkroom. The enclosure 42 is either built around the apparatus in the manner shown, or else the apparatus is built into an already available darkroom of appropriate size, whichever is most convenient in the installation of the apparatus of the invention. In either event, the lens support 28 is built into one wall of the enclosure or darkroom 42 in adjustable but light-tight relation therewith.

Positioned inside of the darkroom or enclosure 42 is a negative carrier, indicated as a whole by the numeral 44. The negative carrier 44 includes a base 46 mounted on flange wheels 48 carried by the rails 10. In certain embodiments of my invention it is possible to rigidly mount the base 46 on the rails 10 so that there is no movement thereon, but when I mount the base 46 for movement suitable means are provided to achieve any desired adjustment along the rails. For example, I may provide a rack 50 which is carried between the rails, and which is engaged by a pinion 52 driven from a gear reducer 54 by an electric motor 56.

Mounted on the base 46 is a rigid table 58 which rotatably supports about a vertical axis a cylindrical turret 60. Mounted on the turret 60 are a plurality, such as six, of negative holders each holder being indicated as a whole by the numeral 62. Each negative holder is adapted to support a negative 64 (see Figs. 3 and 4) in an exact vertical position the same distance from the axis of the turret 60, and in alignment with the lens 32. One typical negative holder is illustrated as including a plurality, usually four, of horizontally directed support arms 66 which carry vertically directed slideway 68 upon which are adjustably mounted opposed channels 70, the channels being adjustably secured in the selected spaced apart position by means of slots 72 in the slideway 68 and thumb nut bolts 74 carried by the channels 70. It will be understood that the channels 70 are adjusted and secured in position the proper distance apart to receive and support a negative of the desired size, and in alignment with the lens 32.

The negatives 64 are usually glass negatives, and are adapted to be secured in the channels 70 in any desired accurate manner, as by the provision of adjustable stops 76 along one flange of the channel and thumb screws 78 threaded into the other flange of the channels 70. A plurality of holes or screws may be provided at spaced points along the flanges of the channels 70 so as to adapt the apparatus to receive and support negatives of different size.

It will be understood that on one of the negative holders 62 a ground glass or a white paper may be mounted of exactly the size of the color separation negative to be made, and that on the remainder of the negative holders a color separation negative is mounted for each one of the color separation negatives to be made, with the stops 76 and the turret 60 being accurately constructed and adjusted so that as each negative is moved in turn into alignment with the lens 32 the ground glass, and the several negatives are positioned exactly in the same position. The indexing movement of the negatives in turn into alignment with the lens 32 can be accomplished by suitable power means, but in the embodiment of the invention illustrated I move the turret 60 by hand and lock it in proper indexed and aligned position by means of a plunger 80 which is normally urged upwardly into locking position by a compression spring 82, but which is adapted to be moved out of locking position by means of a handle 84. The plunger 80 is slidably mounted for accurate vertical movement in the table 58, and is adapted to engage in a conical recess associated with each one of the negative holders 62. Appropriate bushings of highly accurate hardened metal, such as tungsten carbide, may be employed to slidably support the plunger 80 or to provide the conical recess to receive the conical end of the plunger 80 in the turret 60.

I provide additional shielding around the turret 60 and negative holders 62, and in Figs. 1 and 2 of the drawings this additional shielding is indicated by a substantially cylindrical cover 86 surrounding the top, bottom and all sides of the turret, the shielding 86 being open only at the front so that but a single negative in alignment with the lens 32 is exposed to the light passing through the lens. At the vertical edges of the opening in the shielding 86 I provide flexible rubber lips 88 which engage with the sides of the negative holders 62 immediately adjacent to the negative holder 62 in alignment with the lens 32 so as to effect a further sealing of the non-aligned negative holders within the shielding 86. Further shielding strips 89 extend vertically between the arms 66 of the turret 60 and the slideway 68 to cut off any flow of light back into the other negative holders 62 during an exposure on the negative holder 62 in alignment with the lens 32.

An important feature of the invention is the provision of masking mechanism in association with the negative holders, this mechanism being adapted to move out of position to allow indexing of the turret 60, but being adapted to be moved back into exactly the same masking position with any negative holder. The masking mechanism is indicated as a whole by the numeral 90 and includes a frame 92 having a pair of vertically extending channels pivotally mounted at 94 on the base 46. Brackets 96 pivotally secured at 98 to the base 46 are slidably and pivotally secured to posts 100 rigidly held on the frame 92, and with an adjustable stop 102 being provided in association with each post 100 to thereby limit the inward movement of the frame 92.

Extending between the channels of frame 92 is a flat plate 104, this plate either being of glass, or steel with a suitable aperture or window therein. If made of metal, several plates 104 with different size windows therein, may be provided to be used selectively and on different negatives in the frame 92. The purpose of the plate 104 is to removably mount a mask of relatively thin opaque material, the mask being adapted to be releasably mounted upon the glass plate or releasably positioned in the window of the plate if the plate is made of metal. The plate 104 is adjustably received in the channels 92, as best seen in Figs. 3 and 4, and this may be accomplished by the provision of a plurality of adjustable screw stops 106 in one flange of each channel against which one side of both the vertical edges of the plate 104 are engaged. The other side of the plate 104 is gripped by thumb screws 108 extending through the other flange of each channel of the frame 92. Stops 106 and associated thumb screws 108 are provided at vertically spaced distances along each channel of the frame 92 so as to adapt the apparatus to receive and handle plates 104 of different vertical height.

It should be understood that when the masking mechanism 90 is moved to the chain dotted position shown in Fig. 1 that the turret 60 is free to be rotated to move into alignment with the lens 32 and the masking mechanism any desired negative holder 62. When the masking mechanism is moved back into engagement with the aligned negative holder, as shown in full line in Fig. 1, the stops 102 engage with the upper ends of the brackets 96 simultaneously with the engagement of the plate 104 with the aligned negative 64. The stops 76 carrying each negative 64, and the stops 106 positioning the plate 104 of the masking mechanism should be in such accurate register, regardless of which negative holder 62 is in alignment with the lens 32 that the plate 104 bears uniformly with the negative 64 over the entire surface thereof. Or, with the mask positioned between the plate 104 and the negative 64 the mask will bear in uniform pressure manner over the entire area of the negative.

Coming now to the type of mask employed in the apparatus of my invention, and in accord with the method thereof, reference should be had to Fig. 9 which represents a printed reproduction in full color of a typical assembly or arrangement adapted to be made from the printing plates made from the color separation negatives made in accordance with my invention. The numeral 110 indicates a piece of paper on which the printing has been reproduced and in the upper left hand corner of the assembly is a picture of a toaster 112 in full color this having been made with any desired number of color separation printing plates, as for example four. The numeral 114 indicates a full color reproduction of a percolator, this being positioned at the lower left hand corner of the sheet 110. In the lower right hand corner of the sheet 110 is a full color reproduction 116 of a waffle iron, and in the center and right and upper portion of the sheet 110 is a plurality of words carrying the desired advertising message, and printed in the desired number of colors, this printing being indicated as a whole by the numeral 118.

Now in the production of color separation negatives to produce a full color printed reproduction such as shown in Fig. 9 the art work on one figure, such as the toaster 112, is first mounted on the copy carrier easel 16 in alignment with the lens 32. The art work of the toaster may take a variety of forms, as is obvious. The art work may comprise a kodachrome picture of the toaster, it can be previously produced by an entirely different job, it can be an artist's rendition, etc., and it can be to any desired scale, or to any scale in which the art work exists. The turret 60 is now rotated to bring the white paper or ground glass negative holder into alignment with the lens 32, and a mask of substantially the shape shown in Fig. 5 and indicated by the numeral 120 is mounted on the plate 104 of the masking mechanism 90. The mask 120 is opaque except for a window 122, the window 122 being of the size described to receive the toaster on the color separation negative.

It should be explained that in one manner of practicing the invention when a white paper is used instead of a ground glass, a layout of the complete copy 110 is placed on the copy carrier 14 and is focused on the white paper on the negative carrier. Then taking a pencil I outline on the paper each of the figures 112, 114, 116 and 118. Then I can lay up with Scotch tape a mask around the outline and with the sticky side of the tape being outwardly. Then bringing the glass 104 of the masking mechanism 90 down against white paper transfers the Scotch tape to the glass of the masking mechanism in exact masking position and the rest of the glass can be masked off in any desired manner to complete the mask 120. Each of the other masks can be made in the same manner.

The lens 32, as well as the position of the copy carrier 14 is next adjusted so as to focus the art work of the toaster 112 through the window 122 of the mask 120 and on to the paper, the focusing of the art work of the toaster 112 being to the desired scale and orientation so that the toaster properly fills the space provided for it. The shutter of the lens 32 is then closed and the turret 60 is indexed to bring the first color separation negative into alignment with the lens 32. The masking mechanism 90 is moved out of the way during the time that the turret 60 is rotated from ground glass position to the first color separation negative, and then the masking mechanism 90 is moved back to contact the first color separation negative, it being understood that the mask 120 is carried by the plate 104. Now the proper filter (magenta) for the first color separation negative is placed in the filter holder 38, and the lens shutter is opened to give the proper exposure for the first color separation negative, this first color separation negative being say the blue negative. Now the shutter of the lens 32 is closed, the masking mechanism 90 is moved to the chain dotted position, and the turret 60 is rotated to bring the second color separation negative into alignment position with the lens, and the masking mechanism 90 is returned to the solid line position. The proper filter (green) for the second color separation negative is placed in the filter 38 and the shutter of the lens 32 is opened to expose through the window 122 for say all of the red on the second color separation negative. The lens shutter is closed, the masking mechanism 90 is moved out of position, and the turret 60 is indexed to bring the third color separation negative, say the yellow, into alignment with the lens 32. The masking mechanism is returned to solid line position, the proper filter (blue) is placed in the filter holder 38 for the third color separation negative, and exposure is again made by opening the shutter of lens 32. This operation is repeated for the desired number of color separation negatives usually including a "black" color separation negative, made with a K–2 or K–3.

Figure 6:
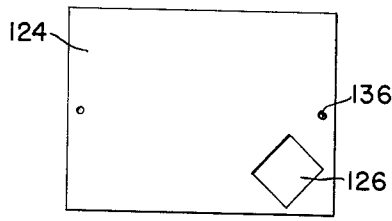
Figure 8:
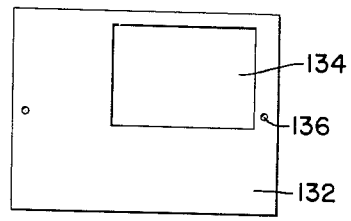

When each one of the color separation negatives have been exposed insofar as the toaster 112 is concerned the turret 60 is returned to the white paper or ground glass position, and the mask 120 is replaced with a mask 124, shown in Fig. 6, and including a window 126. The art work for the second figure, such as the waffle iron 116 is then positioned on the copy carrier 14 in alignment with the lens 32. The position of the lens 32, the copy carrier 14 and in some instances of the base 46 of the negative carrier 44 can be adjusted so that the art work of the waffle iron 116 is focused through the window 126 to the desired scale and orientation on the paper or ground glass. The shutter 32 is then closed, the first color separation negative is brought back into alignment by rotation of the turret 60 and all of the blue of the waffle iron is photographed on the first color separation negative. In a like manner by indexing the turret 60 each one of the color separation negatives is in turn brought into proper alignment and the particular color of the negative is exposed for.

The art work for the waffle iron 116 is now removed from the copy carrier 14 and the art work for the percolator 114 is positioned thereon. The mask 124 is replaced on the masking mechanism 90 by the mask 128, shown in Fig. 7, and having a window 130 therein. The entire operation as previously described is now repeated with respect to the percolator 114. In a like manner the art work for the lettering 118 is next positioned on the copy carrier, the mask 132 of Fig. 8, and with a window 134 therein is positioned on the masking mechanism 90 instead of the mask 128 and each one of the color separation negatives to be used in reproducing the lettering 118 is exposed in turn.

Figure 5:
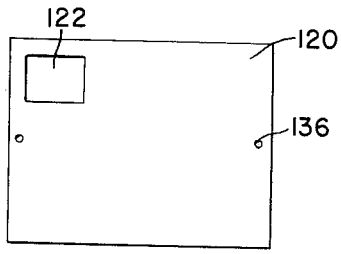
Figure 7:
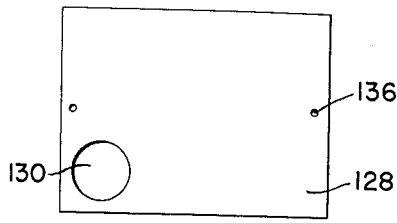

It will be understood that suitable registration marks are present on the mask and negatives, such as indicated by the numeral 136 in Fig. 5, for checking alignment, and to insure registration of the printing plates produced from the color separation negatives.

From the foregoing, the improved method of my invention, as well as the operation of the apparatus embodiment illustrated and described will be understood, and it will be recognized that the various objects of my invention are achieved. The production of composite figure color separation negatives is very considerably facilitated, speeded up, and can be accomplished with ordinary skilled operators as distinct from experts. In the apparatus of my invention an operator in effect works "inside the camera" in the darkroom or enclosure 42 during the handling of the several masks 120, 124, 128 and 132, and the movement of the masking mechanism, the positioning of the filters, etc. With my apparatus the art work for each figure of the composite can be of any scale in which it is available or is produced, and yet each individual figure can be positioned upon and burnt into the several color separation negatives in proper position thereon and without interfering with the burning in of the other figures of the composite. It is this feature and advantage in particular together with the accurate alignment and handling of the negatives which constitute a forward step in the art.

While in accordance with the patent statutes I have particularly illustrated and described my invention, it is to be definitely understood that I am not to be limited thereto or thereby, but that the scope of my invention is defined in the appended claims.

I claim:

1. In apparatus for making composite figure color separation negatives, a turret, a plurality of separate negative carriers positioned at circumferentially spaced places on the turret, means for locking the turret in a plurality of indexed rotative positions to locate the negative carriers accurately, enclosure means for the turret to cover all but one of the negative carriers, resilient sealing means extending between the enclosure means and the turret adjacent the exposed negative carrier, and a pivotally positioned masking member for movement into association with the enclosure means to cover the said one negative carrier and complete the enclosure of the turret.

2. Apparatus as in claim 1 wherein a plate is adjustably carried by said masking member, and means are provided to lock the masking member in engagement with the enclosure means.

3. In apparatus as in claim 1, the negative carriers each comprising a support arm, a pair of parallel vertically directed members carried by the support arm, and a channel adjustably carried by the parallel members and adapted, with the support arm, to engage a negative.

4. In apparatus for making composite figure color separation negatives, a turret, a plurality of separate negative carriers positioned at circumferentially spaced places on the turret, means for locking the turret in a plurality of indexed rotative positions to position the negative carriers accurately, enclosure means for all but one of the front negative carriers, and a pivotally positioned masking member for movement into association with the enclosure means to cover the said one negative carrier and complete the enclosure of the turret, the masking member including a pair of opposed channels, a plate received in and extending between said channels, and means engaging the channels and plate to secure the plate to the channels in an adjustable manner.

5. In apparatus for making composite figure color separation negatives, a turret, a plurality of separate negative carriers positioned at circumferentially spaced places on the turret, means for locking the turret in a plurality of indexed rotative positions to position the negative carriers accurately, enclosure means for all but one of the front negative carriers, a pivotally positioned masking member for movement to and from association with the enclosure means to cover the said one negative carrier and complete the enclosure of the turret, means adjustably securing the negative carriers to the turret, and means adjustably securing the masking member to its support for movement along the axis of the turret whereby the negative carrier and masking member can be aligned with a projected image.

References Cited in the file of this patent
UNITED STATES PATENTS

| | | |
|---|---|---|
| 1,626,841 | Kelley | May 3, 1927 |
| 1,984,420 | Moulin | Dec. 18, 1934 |
| 2,326,367 | Krug | Aug. 10, 1943 |
| 2,356,960 | Wekeman | Aug. 29, 1944 |
| 2,406,770 | Huebner | Sept. 3, 1946 |
| 2,469,891 | Powers | May 10, 1949 |